United States Patent
Ford et al.

[15] 3,681,489
[45] Aug. 1, 1972

[54] METHOD OF FORMING FILMS

[72] Inventors: Thomas R. Ford, Torrance; Edward T. Martin, III, Manhattan Beach, both of Calif.

[73] Assignee: Mattel, Inc., Hawthorne, Calif.

[22] Filed: Jan. 22, 1970

[21] Appl. No.: 4,797

[52] U.S. Cl. .................................................. 264/307
[51] Int. Cl. ............................................. B29c 25/00
[58] Field of Search ..................... 264/305, 307, 308

[56] References Cited

UNITED STATES PATENTS 2,037,893  4/1936  Greenan ...................... 264/307
1,814,981  7/1931  Thornley et al ............. 260/209.6

Primary Examiner—Robert F. White
Assistant Examiner—J. R. Hall
Attorney—Seymour A. Scholnick

[57] ABSTRACT

A method of forming free-standing film and film forming compositions utilized therefor which comprise a first aqueous solution of an alkali metal alginate and surface active agent. This first solution will form an initial water soluble film which is then subsequently dipped in a second solution comprised of an aqueous solution of a salt of a multivalent metallic ion to produce a set insoluble film.

8 Claims, 3 Drawing Figures

PATENTED AUG 1 1972  3,681,489

INVENTORS
THOMAS R. FORD
EDWARD T. MARTIN, III
BY
Max E. Shirk
ATTORNEY

METHOD OF FORMING FILMS

The herein invention is particularly directed to compositions for rapidly forming free-standing films in the absence of any hydrocarbon solvents. Particularly, the invention is directed to a method and compositions for forming free-standing films between a wire frame which can be readily dipped into a solution to form the film therebetween to make flowers or abstract patterns on and between the wire. Additionally, such film can be formed as a coating on suitable bodies dipped into the solution of this invention.

Prior to the herein invention others have formed films on wire forms by dipping the wire into suitable solutions. Prior art had utilized soluble polymeric material to form the free-standing film between the wire network or lattice that was utilized. The typical polymeric materials were cellulose butyrate or acrylics. All the prior art solutions were comprised of such polymers dissolved in various solvents, such as, for example a mixture of acetone and toluene. Thus, most of the prior art methods utilized polymers that were soluble in various hydrocarbon solvents. A wire form is dipped into the solution and coated allowing the film to form across the open span of the frame or lattice network. The film was finally set by a lengthy evaporation of the hydrocarbon solvent. The hydrocarbon solvents used were normally flammable and toxic, and thus not readily suitable for use with children. Further, the evaporation of the solvent normally took a long time. Thus, it took a long time for the film to develop integrity which results from the solvent evaporation. This length of time prevents the prior art technique from being attractive to children.

There are, of course, water soluble polymers that could be film formers, such as polyvinyl alcohol and various cellulosics acrylics and latexes. However, in these systems the water is so slow in evaporating that, practically, it takes too long for the film to develop integrity. For example, with these types of materials it could take one hour or longer at ambient conditions for the water to evaporate and film develop. During this period of time the item could not be handled. As a result, it is not very practical for utilization either by adults or particularly children.

Thus, an object of this invention is to provide a method and suitable solution for rapidly forming free-standing films of good strength characteristics.

Another object of this invention is to provide a method and solution for rapidly forming free-standing films of high clarity.

A still further object of this invention is to provide a method and suitable solutions for rapidly forming free-standing films.

The above and other objects of this invention are accomplished by the utilization of two differing solutions into which a wire form or other body on which a film will be formed are successively dipped. A film is initially formed in the first solution and then set and obtains strength or integrity in the second solution. The first solution comprises a water solution of an alkali metal alginate. This first film forming solution additionally contains a water soluble soap or any suitable water soluble surfactant. Additionally, it is preferred that the solution contain at least one water soluble plasticizer for the film, such as glycerine or salt water soluble high boiling polyhydric alcohols or adducts thereof. Particularly, it has been found that if the solution contains both glycerine and sorbitol as plasticizers, a film of high quality and strength is eventually obtainable and thus this is the preferred embodiment for the film forming solution. Additionally, where the solution is to be stored and have a shelf life, a small amount of preservative is added to prevent micro-bacterial growth.

The second solution used in this invention will be referred to as the set solution. A wire form or other body is initially dipped in the first solution as indicated and the film is formed. However, this film has virtually no integrity. It must be set or strengthened by dipping it into the second solution. The second solution thus contains a water solution of any multivalent metallic water soluble salt, such as calcium chloride. Additionally, the solution can contain a water dispersable or soluble emoluent, such as a solubilized lanolin compound. Additionally, it is preferred that the set solution contain a water soluble humectant, such as glycols, sorbitol or sorbitol esters. The humectant and the emoluent together serve to retard astringency since many of the multivalent metal salts, such as calcium chloride, are astringent and tend to dehydrate and defat human skin. Thus, the addition of these two materials to the set solution makes it safe for use, particularly with children, though it is not required to form a good film. Once again, if shelf life is important, a form of preservative is added to the set solution as well. It is believed that the invention will be better understood from the following detailed description.

The basic chemical reaction involved in the herein invention involves the formation of an initial film formed basically of an alkali metal alginate. When this film formed in the original dipped solution is then disposed into the set solution containing a multivalent metal salt, the multivalent metal ion replaces the alkali metal in the alginate to form a water insoluble film in accord with the following reaction:

$2Na\ Alginate + CaCl_2 \quad Ca(Alginate)_2 + 2NaCl$

The foregoing reaction is essentially disclosed in U.S. Pat. No. 1,814,981 where sodium alginate solution is added to a calcium chloride solution and insoluble fibrous calcium alginate is produced with sodium chloride being formed as a byproduct. Thus, it is apparent that the basic reaction relied upon in the herein invention is old and well known. Others in fact, have utilized alginates as films to provide coatings or the like. However, prior to the herein invention no one was able to formulate a strong free standing film having clarity and good strength properties. Thus, it is pointed out that the additional materials added to the solutions in the herein invention enable one to form such free standing films having superior properties not contemplated by the prior art.

The herein invention is particularly directed to a product that can be readily used by children, and thus must be safe and nontoxic. Additionally, the product cannot be harmful to the skin. Further, it is pointed out that though the herein invention is particularly directed to forming clear strong free-standing films, the film material can obviously be additionally formed on bodies dipped into the two solutions used, and thus not be free standing but merely a coating. It is believed the invention will be better understood from the following detailed description and drawings, in which.

Figure 1A:
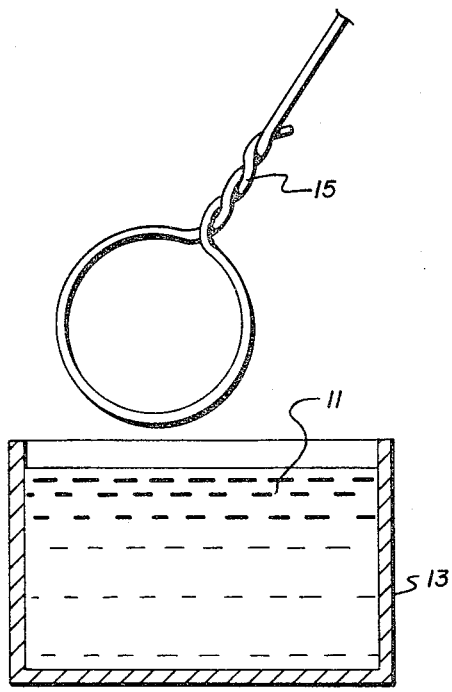
FIG. 1a depicts a wire form and film forming composition.

The first solution utilized in the method of this invention provides a free-standing weak film across the wire bridge or grid which may be dipped therein. The basic component of this solution is an alkali metal alginate. Typical alginates thus include lithium, sodium and potassium alginates. The material normally is commercially available in a granular or powder form, and can vary over a wide molecular weight range. Since it is desirable to get as much of the solids into the solution as possible, it is preferred that low molecular weight material be utilized. However, all molecular weight alginates will work and can range from 10 to 150,000 molecular weight. The alkali metal alginate will generally comprise from 1 to 7 weight percent of the initial film-forming solution. It is preferred, however, that from 3 to 4 weight percent be utilized to provide the best possible properties of the eventually formed film.

The alginate is dissolved in water to form the basic solution. If the alginate is merely dumped into the water, it will often form clumps of the powdered particles and thus becomes difficult to adequately mix into an even solution. In one of the novel aspects of the invention this is overcome by predispersing the alginate in a liquid water soluble polyhydric alcohol or adduct thereof. The alcohol or its adduct additionally performs as a plasticizer for the eventually formed film and prevents the film from being too brittle. A preferred plasticizer or preferred alcohol is glycerine. However, other materials such as high boiling glycols including propylene glycol, polyethylene glycol monostearate, and polypropylene glycol, as well as sorbitol and sorbitol esters and the like, are all suitable. The polyhydric alcohol or adduct thereof should have a boiling point above that of water so that it will permanently remain in the film. If the plasticizer were to evaporate then the film would become brittle and loose its flexible strength. The higher boiling polyhydric alcohols and adducts thereof, such as esters and ethers, are particularly suitable plasticizers since they are compatible with the alginate, readily go into a water solution, and will remain in the film, as indicated. Thus, the initial film-forming solution will comprise from 0 to 30 weight percent of at least one liquid polyhydric alcohol or adduct. As indicated, a small amount is preferred to be initially mixed with alginate to assure the alginate going into the water solution. Thus, at least 1 weight percent of the material is desired.

The use of glycerine, another polyhydric alcohol or adduct alone will give a clear resulting film in accord with the herein invention. However, it has been found that the use of a second additional plasticizer in the film forming composition will greatly increase the strength of the resulting film above that when just glycerine or another single polyhydric alcohol is utilized. Thus, though it is not required, it is found that unexpectedly good results with respect to a strong film are obtained by the utilization of a second plasticizer. In this preferred embodiment of the invention, sorbitol, for example, can be added to the film-forming solution. In fact, it has been found that particularly outstanding results are obtained when glycerine and sorbitol both are incorporated in the film-forming solution to produce a resulting film having excellent quality and high strength properties.

As has been indicated, glycerine alone does not produce as strong a film as might be desired for many applications. Sorbitol alone, on the other hand, does not produce as clear a film as when glycerine is used. Further, sorbitol is not a high boiling liquid and cannot be used to initially disperse the alginate so that it will readily go into solution, which is one of the primary uses of the glycerine or other polyhydric alcohol. Thus, sorbitol solids can be incorporated from zero up to the point where it is the only glycol which would be 30 weight percent of the film-forming solution. In the preferred embodiment, there is at least from 5 to 25 weight percent sorbitol solids in the film-forming solution. It is pointed out that when sorbitol and glycerine are both present the total amount of these materials will not exceed the aforementioned 30 weight percent limit. When both are utilized, it is preferred that there is at least 5 weight percent of each in the film-forming solution.

The film-forming solution in which the film is initially formed additionally contains a water soluble surfactant. The surface active agent is utilized to reduce the surface tension in the film-forming solution. For example, utilizing the herein solutions without the presence of a surface active agent, it has been found that a film will only bridge a gap of less than one-fourth inch. Thus, it can be appreciated that without the utilization of a surface active agent, the practical application of the herein invention is quite limited since most of the desired free standing films produced will bridge a gap considerably in excess of one-fourth inch. As indicated, any water soluble surfactant will suffice to accomplish the aforegoing purposes. Thus, any available water soluble soap will most simply accomplish the desired reduction in surface tension. It is pointed out that the amount of surfactant utilized is important, particularly in that too much of the surfactant present in the solution will result in a significant loss in the film strength. As a result, from 0.001 to 0.20 weight percent of the film-forming solution can comprise the surfactant. It is preferred, however, that the surfactant comprise from 0.02 to 0.03 weight percent of the solution.

The film-forming solution containing the aforegoing ingredients, together with the remaining water base, will comprise a very good culture for micro-bacterial growth. Thus, though it has no effect upon the formation of film, it is desirable to incorporate a small amount of preservative sufficient to retard such potential bacterial growth when the film-forming solution is to have a shelf life. Virtually any known food preservative or the like will suffice. Typical materials include, for example, sodium benzoate, potassium sorbate and propyl parasept which is the propyl ester of methylbenzoic acid. The amount of preservative will preferably range from 0.01 to 1.0 weight percent of the film-forming solution.

To formulate the film-forming solution, as has been briefly indicated above, it is preferred that the alkali metal alginate be initially dispersed in the glycerine or the liquid glycol material utilized. This is done to ensure that the alginate will go into solution in the water base. After dispersion is accomplished in the glycerine or glycol, the mixture is then added to the water used, together with the remaining ingredients. Stirring of the solution is then effected to achieve solution of all of the ingredients. The film-forming solution 11, as seen in FIG. 1a, then is ready for utilization by placement in an open container 13. It will additionally have a long shelf life when stored.

Figure 1B:
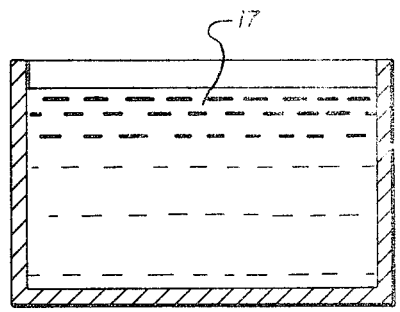
FIG. 1b depicts the set solution.

A wire form 15 can now be dipped into the film-forming solution 11 causing a film to bridge any open areas between the wire. Alternatively a body can be coated with the film when dipped in the solution. The film produced from the solution 11 is obviously still water soluble and virtually useless as such. Due to the presence of the plasticizers in the solution 11 such a film will never dry to a very solid material even upon all the water evaporating therefrom. Additionally and more importantly, the film so produced does not have any strength characteristics and can be readily punctured. Thus, it is necessary that the film so produced be dipped in a second solution referred to as set solution 17, as seen in FIG. 1b, in which the film is hardened and made water insoluble. The basic component of the set solution is a multivalent metallic water soluble salt. As indicated in the aforegoing general reaction, the metallic ion replaces the alkali metal portion of the alginate to form a water insoluble alginate. Typical metallic ions, for example, could comprise magnesium, aluminum, calcium, chromium, barium and the like. The salt portion can comprise acetates, halides, nitrates, sulfates, phosphates, and in some instances water soluble carbonates such as magnesium carbonate. The main requirement of the salt is that it of course be water soluble. The particularly preferred salt is calcium chloride because it has a low cost, is relatively nontoxic, is highly water soluble, and provides a high strength film.

The amount of the salt utilized in the set solution can vary from 1 weight percent up to a super saturated water solution of the salt. Normally, it has been found that a solution comprising from 4 to 6 weight percent of the salt will produce outstanding films. Generally all that is required for a successful film thus is a water solution of a salt with a multivalent metallic ion. However, some of the slats are astringent, such as the preferred calcium chloride, and would tend to dehydrate and defat human skin. However, this astringency in the amounts of the salts preferred to be used is not so severe as to prevent utilization by humans. But in order to make the invention safer for use with children particularly, it is desired that the astringency is overcome by the addition of a water soluble humectant and a water soluble or dispersable emollient. Virtually any water soluble humectant can be used, such as glycerine, sorbitol, sorbitol esters, propylene glycol, and the like. Generally, from 2 to 50 weight percent of such humectant can be used in the solution. It is found that very good results are obtained when from 2 to 4 weight percent of the humectant is used.

Additionally, any suitable emollient is added to the set solution, together with the humectant to overcome the astringency of the solution. Most typical emollients are lanolins. Additional emollients, for example, can comprise solubilized fatty esters of glycols and self-emulsifying fats or oils. The main requirement for the emollient is that it be at least dispersable in the set solution. Thus, it need not be water soluble as long as it can be suitably so dispersed. It is desired to incorporate from 2 to 10 weight percent of the emollient in the set solution in order to overcome any astringency effect. It should again be emphasized that neither the emollient nor the humectant is required in the set solution if the metal slat has little or no astringency or defating power.

Additionally, it is desirable to incorporate a small amount of preservative in the set solution. Even though it does not have the culture growing capability of the film-forming solution, being water based it can be a foundation for a bacterial growth. Thus, a small amount of preservative, generally from 0.01 to 1 weight percent of the set solution can contain a preservative of the same type as used in the film-forming solution.

Figure 2:
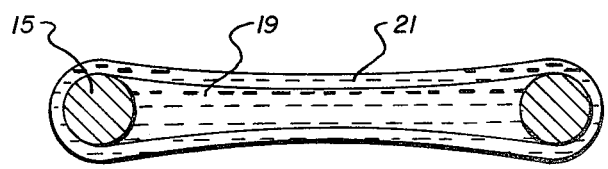
FIG. 2 is a cross-sectional view of a wire form having two film layers.

One particular feature of the herein invention is the ability to readily and rapidly increase the thickness and strength of a film depending upon the desired application. This is simply accomplished by initially forming a first set film 19, as seen in FIG. 2, performing the two dip steps described above, and then repeating the process to form a second overlying film 21. This process can be repeated each time building up a successive layer of film on top of the previously formed one. It should be apparent that this procedure provides a very rapid and easy means of forming laminate structures in which glitter or other colored particles can be disposed on a previously formed film, and then upon dipping it again into the dip solution a layer will be formed thereover.

The basic solutions aforementioned will provide a clear transparent, colorless, odorless film. Obviously, it is desirable that one be able to form films of varying desired selected colors. This can be simply accomplished by adding a suitable coloring agent to the dip solution. Thus, from 0.001 to 5.0 amount of coloring additives, such as soluble certified color, can be preferably added to the dip solution to give color the films produced which still remain transparent. Typical coloring agents include, for example, F. D. & C. (Food Drug & Cosmetic) colors such as yellow No. 5, yellow No. 6, and red No. 4.

Additionally, if desired, one can add a small amount of fragrance to the film. If one were making artificial flower petals or the like, one could then produce them with the desired flower fragrance. This is accomplished by adding any suitable water soluble fragrance in the amount of about 0.5 to 2.0 weight percent based on the entire weight of the film-forming solution.

One of the advantages of the method utilizing the compositions preferably disclosed is that the films can be formed and set rapidly. Thus, after the wire form 15, as seen in FIG. 1a is dipped into the film-forming solution 11 and removed therefrom with the film on the wire, it can be immediately placed into the set solution 17. In other words, one does not have to wait for the film formed from solution 11 to dry before placing into the set solution. There is virtually no residency time required in the set solution 17. The wire form 15 containing the film formed is merely dipped into the solution and removed therefrom, since the reaction takes place almost instantaneously. The resulting set film formed on the wire 15 is initially wet and somewhat sticky. It will dry to a non-sticky form in a short period of time, generally ranging from 2 to 10 minutes depending upon ambient conditions of temperature and percent humidity. The film will be completely dry to point where there is no further weight loss in from 10 minutes to one hour. It is while the initial film formed is in the wet state that the solid particulate coloring particles or the like can be added to it so they will adhere, prior to a second dipping to form the laminate structure mentioned above. It is believed that the invention will be further understood from the following detailed examples:

EXAMPLE I

In this example and the following examples, a wire form in the shape of an oval having a dimension of about 1 ½ × 2 inches, was utilized to dip into the solutions made to form the film. A film-forming solution was formulated comprising 3 grams or 3.53 weight percent sodium alginate, and utilizing 18.8 grams or 22.10 weight percent of a 70 percent sorbitol solution. The sorbitol solution thus contained 70 weight percent sorbitol solids dissolved in water. The composition additionally comprised 2 drops of Orvus-K made by Proctor & Gamble which is a water soluble soap. In addition to the aforegoing components, the film-forming solution additionally contained 0.2 grams or 0.24 weight percent of propyl parasept made by McKesson & Robbins, which is a propylester of methyl benzoic acid and serves as a preservative. The remainder of the solution which was 63.1 grams or 74.20 weight percent, was water. The solution was made by first mixing the sorbitol solution with the water, dissolving the propyl parasept into the formed solution, and then adding the Orvus-K. Finally, the sodium alginate was mixed into the material. Considerable mixing was required in order to get the sodium alginate well dispersed into solution without any remaining particles or lumps. The set solution was a 10 weight percent water solution of calcium chloride. The wire form was dipped into the film-forming solution and removed therefrom with a film covering the oval. It was then immediately placed into the set solution and was withdrawn therefrom. The formed film dried in 5 minutes and was strong. However, it was not absolutely clear.

EXAMPLE II

A film-forming solution utilizing glycerin in place of the sorbitol was formulated. The solution comprised 3.95 weight percent sodium alginate, 25 weight percent glycerin, 0.05 weight percent Orvus-K, 0.20 weight percent propyl parasept, and 70.80 weight percent water. The film forming composition was formulated by first dispersing the sodium alginate in the glycerin. This mixture was then added to the water, to which was added the remaining materials. Very little mixing was required in order to achieve solution of the sodium alginate in the water. The set solution was again a 10 weight percent solution of calcium chloride. The film produced was clearer than the film utilizing the sorbitol of Example I. However, it did not appear to be as strong as the film formed from the sorbitol. This was particularly evidenced when trying to provide a second coating. In some instances, the film formed from the solution of glycerin alone would not support a second layer of film, while in all instances the sorbitol film did support a second layer.

When a 5 weight percent calcium chloride set solution was utilized, it was found that the dry time of the glycerin film was increased significantly from 5 minutes to about 30 minutes.

EXAMPLE III

Two different solutions having the same weight percent of constituents were formulated. The first solution utilized polyethylene glycol, the second polypropylene glycol, as plasticizers. Each solution comprised 3 weight percent sodium alginate, 12 weight percent of the glycol, 2 drops of Orvus-K. The solutions additionally comprised 0.2 weight percent propyl parasept and 83.1 weight percent water. A 10 weight percent calcium chloride set solution was utilized for both of the film-forming solutions. It was found that the films produced from polyethylene glycol and polypropylene glycol were quite strong. However, they seemed to have greater bubble entrapment than either the sorbitol or glycerin, and were not quite as clear as the glycerin films. Both films dried in about 5 minutes.

EXAMPLE IV

Two film-forming solutions were made utilizing Carbowax 350 and Carbowax 400, respectively, in the same amounts as the plasticizer. These materials are made by Union Carbide Corp., and are polyethylene glycols. Each solution comprised 1.6 grams or 2.0 weight percent sodium alginate, 15 grams or 19.5 weight percent of the carbowax, together with 2 drops or Orvus-K, 0.1 grams or 0.13 weight percent propyl parsept, and 60 grams or 78.30 weight percent water. The films formed utilizing the carbowax solutions were dipped in a 10 weight percent solution of calcium chloride and produced strong films which had some bubble entrapment and were not quite as clear as the glycerin film.

EXAMPLE V

A preferred film-forming solution was made comprising 3.42 weight percent sodium alginate, 0.11 weight percent propyl parasept, 6.28 weight percent glycerin, 0.03 weight percent Orvus-K, 11.201 weight percent of 70 percent sorbitol solution, and 70.75 weight percent water. This film formed solution was formulated by first dispersing the sodium alginate in the glycerin, adding the mixture to the water, and then adding the remaining materials to the formed solution. The set solution comprised 4 weight percent propylene glycol, 4 weight percent of Lantrox LWS made by the Malstrom Chemical Company, which is solubilized lanolin compound. Additionally, the set solution comprised 5 weight percent of anhydrous calcium chloride, 0.10 weight percent sodium benzoate, and 86.90 weight percent water. The film formed from utilizing the foregoing compositions was exceptionally strong and very clear, having no bubbles therein. Further, the initial film readily supported a second film thereon. It was found that the resulting films dried in under 5 minutes time.

Various colored solutions were additionally formulated utilizing the aforegoing film forming composition, adding thereto 1.52 weight percent F. D. & C. blue No. 1, which was a 10 weight percent solution of the dye in water. Additional film-forming solutions utilizing the same amount of the coloring agent in 10 weight percent solutions in water of the following colors: yellow No. 1, yellow No. 5, and red No. 4. Further, 10 weight percent solution in water of violet No. 1 was added to a film forming solution. A lesser amount of the violet is utilized in order to obtain a transparent film. At higher percentages of the violet the film tends to lose the transparence. All of the aforegoing produced transparent colored films incorporating the color of the dye material utilized. Though for aesthetic purposes, it is desirable to provide transparent colored films, it should be obvious that opaque films can be formed in accord with the herein invention. This can be accomplished by increasing the amount of the coloring agents mentioned above or utilizing insoluble pigments, such as insoluble metal oxides including zinc and titanium oxides.

We claim

1. A process of preparing films comprising:
   dipping a body comprising an open frame into a first aqueous solution of an alkali metal alginate containing a surface active agent in an amount sufficient to provide a free standing film,
   removing said body from said aqueous solution of an alkali metal aglinate,
   dipping said body in a second aqueous solution of a salt of a multivalent metallic ion, and
   removing said body from said second solution whereby a free-standing film is formed to span said frame.

2. The process of claim 1 wherein said alkali metal alginate comprises from 1 to 7 weight percent of the first solution.

3. The process of claim 1 wherein said surface active agent comprises from 0.001 to 0.20 weight percent of said first solution.

4. The process of claim 1 wherein said first solution additionally comprises:
   at least one water soluble plasticizer for said film selected from the class consisting of polyhydric alcohols and adducts thereof.

5. The process of claim 4 where at least one plasticizer is glycerine.

6. The process of claim 5 where said first solution additionally comprises sorbitol as a second plasticizer.

7. The process of claim 4 wherein the total amount of plasticizer comprises up to 30 weight percent of the solution.

8. The process of claim 6 where there is at least 5 weight percent of each of the plasticizers in the solution.

* * * * *